United States Patent [19]

Maruyama et al.

[11] Patent Number: 4,707,512
[45] Date of Patent: Nov. 17, 1987

[54] POLYESTER RESIN COMPOSITION

[75] Inventors: Seiichiro Maruyama; Hironori Hayashida; Kazumasa Morita; Yoshitaka Shiraishi, all of Kitakyushu, Japan

[73] Assignee: Mitsubishi Chemical Industries Limited, Tokyo, Japan

[21] Appl. No.: 753,982

[22] Filed: Jul. 11, 1985

[30] Foreign Application Priority Data

| Jul. 16, 1984 | [JP] | Japan | 59-146119 |
| Feb. 28, 1985 | [JP] | Japan | 60-39676 |
| Feb. 28, 1985 | [JP] | Japan | 60-39677 |
| Apr. 9, 1985 | [JP] | Japan | 60-74704 |
| Apr. 9, 1985 | [JP] | Japan | 60-74707 |

[51] Int. Cl.$^4$ .................. C08L 67/02; C08L 51/06
[52] U.S. Cl. .................. 524/504; 525/64; 525/284
[58] Field of Search ............ 525/176, 284, 64; 524/504

[56] References Cited

U.S. PATENT DOCUMENTS 4,172,859  10/1979  Epstein .................. 428/402

FOREIGN PATENT DOCUMENTS 52-32045  3/1977  Japan .
55-50058  4/1980  Japan .
56-16145  12/1981  Japan .

Primary Examiner—Patricia A. Short
Attorney, Agent, or Firm—Oblon, Fisher, Spivak, McClelland, & Maier

[57] ABSTRACT

Disclosed herein is a polyester composition comprising a polyester and a modified copolymer of ethylene and an α-olefin prepared by grafting (1) an ester of an α,β-unsaturated carboxylic acid represented by the formula(I):

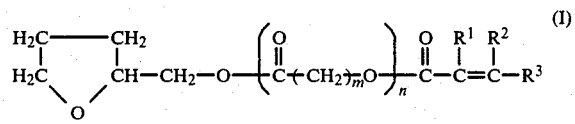

wherein n is an integer of from 0 to 4; m is an integer of from 1 to 10; $R^1$ and $R^2$ respectively represent a hydrogen atom or an alkyl group and $R^3$ represents a hydrogen atom, an alkyl group or a carboxyl group, or (2) said ester of an α,β-unsaturated carboxylic acid represented by the formula (I) and n α,β-unsaturated carboxylic acid or an anhydride thereof with a copolymer of ethylene and an α-olefin.

6 Claims, No Drawings

POLYESTER RESIN COMPOSITION

BACKGROUND OF THE INVENTION

The present invention relates to a polyester composition, and more in detail, the present invention relates to a polyester composition for producing shaped articles which are excellent in mechanical properties such as impact strength, tensile strength, bending strength, etc. and show excellent appearance and colour tone. Of the polyester composition according to the present invention, particularly those containing a carbodiimide compound are the useful polyester composition in the field where dimensional-stability of the shaped articles such as automobile connectors is demanded because of the hinge-resistance property of the carbodiimide-containing polyester composition.

Since the thermoplastic polyester represented by polyethylene terephthalate, polybutylene terephthalate, polyethylene naphthalate, etc. is excellent in mechanical properties and heat-resistance as well as in dimensional-stability, the thermoplastic polyester is utilized as the material for automobile connectors, electric connectors or electronic connectors.

By the way, in the case where the automobile connector knob made of polyamide is used, there is a danger wherein the connection of the connector becomes loose and comes off by the vibration of the automobile or the dimensional variation of the connector. Accordingly, the polyesters favorable in the dimensional-stability, such as polybutylene terephthalate, have attracted attention of persons skilled in the art. On the other hand, as a counter measure to the vibration during the covering of the automobile, it has been considered to additionally attach a rock-mechanism utilizing a hinge to the connector. However, there is a problem of breaking of the thus attached rock-part, because the ordinary polyester is poor in the hinge-property.

Namely, the polyester of the improved hinge-property has been demanded.

Hitherto, as a method for improving the impact strength of the polyester, a method of adding a modified copolymer of ethylene and an α-olefin by grafting an α,β-unsaturated carboxylic acid to the copolymer, or adding an acrylic rubber to the polyester has been known, and in addition, a method of adding a random copolymer having functional groups adherable to the matrix (i.e., the polyester) with the polyester has also been known (refer to Japanese Patent Publication No. 59-28223 (1984)).

Furthermore, a method has also been known for improving the tensile strength and the bending strength of the polyester, wherein an inorganic filler represented by glass fiber is added to the polyester.

However, in the case of adding both the above-mentioned random copolymer and the glass fibers to the polyester, although the impact strength, the tensile strength and the bending strength of the thus produced resin composition are improved, respectively, the impact strength of the resin composition is inferior to that of the resin composition with which only the random copolymer is added, and the tensile strength and the bending strength of the thus produced resin composition are inferior to those of the resin composition with which only the glass fibers is added.

As a result of the present inventors' studies for improving the mechanical properties of the polyesters, the present inventors have obtained a finding that the impact strength, tensile strength and bending strength of the polyester can be simultaneously improved by adding a modified copolymer of ethylene and an α-olefin prepared by grafting a specified compound with a copolymer of ethylene and α-olefin, with the polyester, and that a more excellent effect is obtained by adding, in case of necessity, an epoxy compound, a carbodiimide compound and an inorganic filler to the polyester in addition to the modified copolymer, and the present invention has been attained on the basis of the present inventors finding.

SUMMARY OF THE INVENTION

In an aspect of the present invention, there is provided a polyester composition comprising a polyester and a modified copolymer of ethylene and an α-olefin prepared by grafting (1) an ester of an α,β-unsaturated carboxylic acid represented by the formula(I):

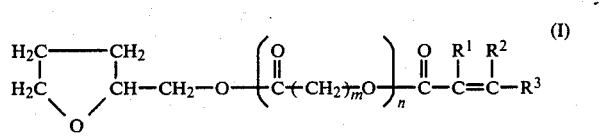

wherein n is an integer of from 0 to 4; m is an integer of from 1 to 10; $R^1$ and $R^2$ respectively represent a hydrogen atom or an alkyl group and $R^3$ represents a hydrogen atom, an alkyl group or a carboxyl group, or (2) said ester of an α,β-unsaturated carboxylic acid represented by the formula (I) and an α,β-unsaturated carboxylic acid or an anhydride thereof with a copolymer of ethylene and an α-olefin.

DETAILED DESCRIPTION OF THE INVENTION

The present invention relates to a polyester composition comprising a thermoplastic polyester and a modified copolymer of ethylene and an α-olefin prepared by grafting an ester of an α,β-unsaturated carboxylic acid with a copolymer of ethylene and α-olefin, or a modified copolymer of ethylene and an α-olefin prepared by grafting the ester of an α,β-unsaturated carboxylic acid and other α,β-unsaturated carboxylic acid or the anhydride thereof with a copolymer of ethylene and α-olefin and, in case of necessity, an epoxy compound, a carbodiimide and an inorganic filler, the ester of an α,βunsaturated carboxylic acid being represented by the formula (I):

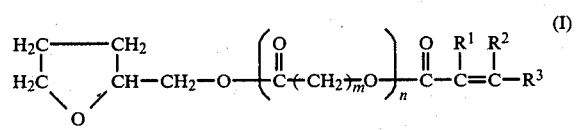

wherein n is an integer of 0 to 4; m is an integer of 1 to 10; $R^1$ and $R^2$ respectively represent a hydrogen atom or an alkyl group, preferably an alkyl group having one to two carbon atoms and $R^3$ represents a hydrogen atom, an alkyl group, preferably an alkyl group having one to two carbon atoms or a carboxyl group.

The "graft" in the present invention means that a modifier such as an ester of an α,β-unsaturated carboxylic acid etc. reacts with a base polymer such as a copolymer of ethylene and α-olefin, namely, that a polymer of the modifier graft-polymerizes with the base polymer and the modifier reacts with the base polymer without polymerization of the modifier.

The thermoplastic polyester used in the present invention is a polyalkylene terephthalate obtained by polycondensation of terephthalic acid or a dialkyl terephthalate with an aliphatic glycol, or a copolymer mainly composed of the polyalkylene terephthalate, and as a representative polyalkylene terephthalate, polyethylene terephthalate, polybutylene terephthalate and the like may be mentioned.

As an aliphatic glycols, ethylene glycol, propylene glycol, tetramethylene glycol, hexamethylene glycol and the like may be mentioned, however, other diols or polyols may be admixed with the aliphatic glycol. For instance, not more than 30% by weight of cyclohexanediol, cyclohexane dimethanol, xylylene glycol. 2,2-bis(4-hydroxyphenyl)propane, 2,2-bis(4-hydroxy-3,5-dibromophenyl)propane, 2,2-bis(4-hydroxyethoxyphenyl)propane, 2,2-bis(4-hydroxyethoxy-3,5-dibromophenyl)propane, glycerol, pentaerythritol and the like may be admixed with the aliphatic glycol.

In addition, other dibasic acids, polybasic acids or alkyl esters thereof may be admixed with terephthalic acid or dialkyl terephthalate. For example, not more than 30% by weight of phthalic acid, isophthalic acid, naphthalenedicarboxylic acid, diphenyldicarboxylic acid, adipic acid, sebacic acid, trimesic acid, trimellitic acid, an alkyl ester thereof and the like may be admixed with terephthalic acid or a dialkyl terephthalate.

The polyester resin having a limiting viscosity number ($[\eta]$) of 0.4 to 1.5, preferably around 0.5 to 1.4 is suitably used.

The modified copolymer of ethylene and an $\alpha$-olefin is obtained by grafting the ester of an $\alpha,\beta$-unsaturated carboxylic acid represented by the formula(I), or the ester of an $\alpha,\beta$-unsaturated carboxylic acid represented by the formula(I) and another $\alpha,\beta$-unsaturated carboxylic acid or the anhydride thereof with a copolymer of ethylene and an $\alpha$-olefin having not less than three carbon atoms (hereinafter referred to as the unmodified copolymer of ethylene and an $\alpha$-olefin).

The unmodified copolymer of ethylene and an $\alpha$-olefin, which is used as the raw material for the modified copolymer of ethylene and an $\alpha$-olefin, is obtained by copolymerizing not less than 50 mol %, preferably 80 to 95 mol % of ethylene and not more than 50 mol %, preferably 20 to 5 mol % of an $\alpha$-olefin having not less than three carbon atoms in the presence of a Tiegler-Natta catalyst, for example, a vanadium compound such as vanadium oxytrichloride or vanadium tetrachloride and an organoaluminum compound may be mentioned.

As the $\alpha$-olefin having not less than three carbon atoms, although propylene, butene-1, hexene-1, decene-1, 4-methylbutene-1, 4-methylpentene-1 and the like may be mentioned, propylene and butene-1 is preferable.

As the suitable one of the unmodified copolymers of ethylene and an $\alpha$-olefin, resins commerciallized under the registered trade mark of TAFME ® by MITSUI Petrochemical Industry Co., Ltd., for instance, (copolymer of ethylene and butene-1) (Tafmer A series) such as Tafmer A 4085, Tafmer A 4090, Tafmer A 20090, etc., and copolymer of ethylene and propylene (Tafmer P series) such as Tafmer P 0280, Tafmer P 0480, Tafmer P 0680, Tafmer P 0880, etc. may be mentioned.

As the $\alpha,\beta$-unsaturated carboxylic acid of the ester of an $\alpha,\beta$-unsaturated carboxylic acid represented by the formula(I), which is used in grafting the unmodified copolymer, acrylic acid, methacrylic acid, ethacrylic acid, maleic acid and fumaric acid may be mentioned, however, among the esters of one of the above-mentioned acids, the ester of acrylic acid or methacrylic acid represented by the following formula is particularly preferable,

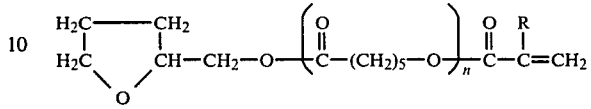

wherein R represents a hydrogen atom or a methyl group and n is an integer of from 0 to 4.

The grafting amount of the ester of an $\alpha,\beta$-unsaturated carboxylic acid represented by the formula(I) to the unmodified copolymer of ethylene and an $\alpha$-olefin is from 0.01 to 2.0% by weight, preferably from 0.02 to 1.8% by weight. In the case where the grafting amount is less than 0.01% by weight, the impact strength of the composition is not improved and on the other hand, in the case where the grafting amount is more than 2.0% by weight, gases are produced during molding and silver streak appears on the surface of the molded product.

In addition, as other $\alpha,\beta$-unsaturated carboxylic acid or the anhydride thereof which is grafted together with the ester represented by the formula(I) with the unmodified copolymer of ethylene and an $\alpha$-olefin, acrylic acid, methacrylic acid, ethacrylic acid, maleic acid, fumaric acid and anhydrides thereof may be mentioned, and of the acids and the anhydrides, maleic anhydride is particularly favorable.

The amount of the $\alpha,\beta$-unsaturated carboxylic acid or the anhydride thereof to be grafted with the unmodified copolymer of ethylene and an $\alpha$-olefin is from 0.05 to 5% by weight to the amount of the unmodified copolymer of ethylene and an $\alpha$-olefin.

In the case of using other $\alpha,\beta$-unsaturated carboxylic acid or the anhydride thereof together with the ester of the $\alpha,\beta$-unsaturated carboxylic acid represented by the formula(I), the physical properties of the product such as IZOD impact strength and the tensile elongation are improved as shown in Examples. However, the excess amount of the $\alpha,\beta$-unsaturated carboxylic acid or the anhydride thereof causes coloration of the product and accordingly, the excess amount is not favorable. The preferable amount thereof is in the range of 0.07 to 3% by weight to the amount of the unmodified copolymer of ethylene and $\alpha$-olefin.

The graft is carried out in line with an ordinary process, i.e. by melting and kneading a mixture of the copolymer of ethylene and an $\alpha$-olefin and the ester of the $\alpha,\beta$-unsaturated carboxylic acid represented by the formula(I) or a mixture of the copolymer of ethylene and an $\alpha$-olefin, the ester of the $\alpha,\beta$-unsaturated carboxylic acid represented by the formula(I) and the $\alpha,\beta$-unsaturated carboxylic acid or the anhydride thereof ordinarily at a temperature of from 150° to 300° C.

As the method for grafting two kinds of compounds with a copolymer, a successive method of grafting one of the two compounds at first with the copolymer and thereafter, grafting the other of the two compounds with the thus once grafted copolymer may be adopted. In case of melt-kneading, a screw extruder is frequently used for the purpose. In such a case, an organic peroxide such as $\alpha,\alpha'$-bis-tert-butylperoxy-p-diisopropylbenzene may be used in an amount of 0.001 to 0.05% by weight of the unmodified copolymer of ethylene and an α-olefin for taking place effectively the graft.

It is preferable that the crystallinity of the modified copolymer of ethylene and an α-olefin (measured by the X-ray method according to Jounal of Polymer Science, Volume XVII, 17–26(1955)) is not higher than 75%, preferably in the range of from 1 to 35%, and that the melt index thereof is in the range of 0.01 to 50, preferably 0.02 to 30 (unit g/10 min, measured at 190° C. by ASTM D 1238 57 T).

In order to prepare the modified copolymer of ethylene and an α-olefin of the above-mentioned crystallinity and melt index, the unmodified copolymer of ethylene and an α-olefin having the crystallinity of not more than 75%, preferably 1 to 35% and the melt index (hereinafter referred to as MI) of 0.01 to 50, preferably 0.02 to 30 may be used.

It is preferable to admix 0.5 to 120 parts by weight of the modified copolymer of ethylene and an α-olefin with 100 parts by weight of the polyester in preparing the resin composition according to the present invention. In the case where the amount of the modified copolymer is below 0.5 part by weight, the effect of improvement is not sufficient, and on the other hand, in the case where the amount is over 120 parts by weight, the heat-resistance of the resin composition is impaired. The particularly preferable amount of the modified copolymer is in a range of 5 to 100 parts by weight of the polyester.

In the present invention, in the case of using together an epoxy compound in the preparation of the polyester compositions, the shaped articles of the obtained polyester composition shows a particularly higher impact strength, a suitable bending strength and an excellent appearance as well as an excellent colour tone.

The epoxy compound used in the present invention is a polyfunctional epoxy compound having not less than two epoxy groups or having at least one epoxy group and other functional group(s) such as silanol group, and preferably a bifunctional epoxy-treating agent or an epoxysilane-treating agent. Concretely, as the epoxysilane-treating agent, β-(3,4-epoxycyclohexyl)ethyltrimethoxysilane, γ-glycidoxypropyltrimethoxysilane and the like may be mentioned, and as the bifunctional epoxy compound, an aliphatic diepoxy compound such as bisepoxydicyclopentadienyl ether of ethylene glycol and butadiene diepoxide, an aromatic diepoxy compound such as diglycidyl ether of bisphenol A and diglycidyl ether of phthalic acid, a cycloaliphatic diepoxy compound such as 3,4-epoxycyclohexylmethyl 3,4-epoxycyclohexanecarboxylate, 3,4-epoxy-6-methylcyclohexylmethyl 3,4-epoxy-6-methylcyclohexanecarboxylate, 2,3-epoxycyclohexylmethyl 3,4-epoxycyclohexanecarboxylate, 4-(3,4-epoxy-5-methylcyclohexyl)butyl 3,4-epoxycyclohexanecarboxylate, bis(3,4-epoxycyclohexylmethyl) adipate, bis(3,4-epoxy-6-methylcyclohexylmethyl) adipate, 2-(3,4-epoxycyclohexyl-5,5-spiro-3,4-epoxy)cyclohexane-metadioxane and a halogen-containing diepoxy compound such as tetrabromobisphenol A diglycidyl ether may be mentioned. Of these epoxy compounds, bisphenol A diglycidylether is particularly preferable.

As the amount of addition of the epoxy compound, an amount of from 0.01 to 5 parts by weight to the amount of 100 parts by weight of the polyester is preferable, and particularly, an amount of from 0.1 to 2 parts by weight is particularly preferable. The smaller amount cannot show the effect thereof, and on the other hand, the larger amount of addition of the epoxy compound causes the rise of melt viscosity of the epoxy resin composition, and as a result, it becomes necessary to rise the temperature of shaping, and the rise of the temperature of shaping causes the thermal deterioration of the resin composition during shaping.

In the present invention, in the case of using together with a carbodiimide and the epoxy compound, a polyester composition is excellent in hinge-resistant property in addition to the impact-resistance.

As the carbodiimide compound used according to the present invention, for instance, the carbodiimide compound obtained by thermal decarboxylation of an isocyanate may be mentioned and as a concrete example, diphenylcarbodiimide, ditolylcarbodiimide, di-(propylphenyl)carbodiimide di-(butylphenyl)carbodiimide, dinaphthylcarbodiimide, bis(dipropylphenyl)carbodiimide, polyphenylenecarbodiimide, polytolylenecarbodiimide, poly(propylphenyl)carbodiimide, poly(dipropylphenyl)carbodiimide, poly(diphenylmethane)-carbodiimide, polynaphthylenecarbodiimide and the like may be mentioned. As the amount of addition of the carbodiimide, 0.01 to 5 parts by weight of the carbodiimide to 100 parts by weight of the thermoplastic polyester and preferably, 0.05 to 3 parts by weight of the carbodiimide is preferable. In the case of not less than 5 parts by weight of the carbodiimide, the thus obtained resin composition is coloured to impair the commercial value thereof, and on the other hand, in the case of not more than 0.01 part by weight of the carbodiimide, any effect of improving the hinge-resistance is not provided.

In the case where an inorganic filler is added to the resin composition consisting of the polyester and the modified copolymer of ethylene and an α-olefin, a resin composition is excellent in the mechanical properties such as impact strength, tensile strength and bending strength, and in the case where an epoxy compound is used together with the inorganic filler, the effect of improving the mechanical properties of the polyester resin composition becomes larger.

As the inorganic filler used in the present invention, inorganic fibers, powdery metals, metal oxides, metal carbonates, metal sulfates, clays, powdery carbon and the like may be mentioned, and concretely, glass fibers, carbon fibers, metallic whiskers, powdery aluminum, powdery zinc, silica, alumina, silica-alumina, titania, magnesia, calcium carbonate, barium carbonate, aluminum sulfate, barium sulfate, calcium sulfate, kaolin, talc, wollastonite, bentonite, diatomaceous earth, novaculite, silica sand, powdery quartz, powdery pumice, asbestos, powdery feldspar, carbon black, powdery graphite, powdery glass, etc. may be mentioned. Particularly, inorganic fillers of silicic acids are preferable, and in order to improve the heat-resistance of the polyester composition, glass fiber is more preferable. In the case where the appearance of the shaped articles of the polyester composition is taken seriously, the use of particles of a mean diameter of 1 to 100 μm such as those of wollastonite, talc, kaolin, mica, powdery glass, etc. is preferable.

In particular, in the case where carbon black of the inorganic fillers is added to the resin composition comprising the polyester and the modified copolymer of ethylene and an α-olefin, an electroconductive polyester composition having an excellent impact-strength is obtained.

Any carbon black may be used in the present invention without any limitation, however, carbon black selled as the electroconductive carbon black, for instance, KECHENBLACK ® EC (made by Lion-Akzo Co., Ltd.), VULCAN ® XC-72(made by Cabott Co., Ltd.), DENKA-ACETYLENEBLACK ® (made by DENKI KAGAKU KOGYO Co., Ltd.) and CONDUCTEX ® BC (made by City Service Co. Ltd.) are preferable, and in addition, the carbon black by-produced by partially oxidizing a hydrocarbon such as naphtha and the like in the presence of steam and oxygen to produce a synthetic gas containing hydrogen and carbon monoxide, and the carbon black obtained by treating the thus by-produced carbon black through oxidation may be mentioned as the carbon black used in the present invention. Of the above-mentioned two kinds of carbon black, carbon black having the specific surface area (measured by a nitrogen-absorbing method at lower temperatures by B.E.T.-type) of larger than 600 $m^2/g$, particularly 800 $m^2/g$ the oil-absorption value (amount of linseed oil absorbed in 100 g of the carbon black) of larger than 200 ml/100 g, particularly 250 ml/100 g are favorably suitable for the purpose of the present invention.

The amount of addition of the inorganic filler is 0.5 to 120 parts by weight to 100 parts by weight of the thermoplastic polyester, and preferably 1 to 100 parts by weight thereto to 100 parts by weight of the thermoplastic polyester. No effect of addition is obtained by adding less than 0.5 part by weight of the inorganic filler, and on the other hand, the mechanical properties of the polyester composition is reduced by adding more than 120 parts by weight of the inorganic filler.

The admixing of the above-mentioned additives, namely the modified copolymer of ethylene and $\alpha$-olefin, the epoxy compound, the carbodiimide compound and the inorganic filler with the polyester can be carried out by several methods in any optional stage until just before the molding of the thus admixed composition. Although the most simple method of admixing is dry-blending of the polyester and the additives, the thus dry-blended material may be melt-extruded to be pellets. There may be a method wherein the master pellets are prepared by blending the excess amount of the additives with the polyester and then the thus prepared master pellets are blended with the pellets of the polyester for dilution.

In order to obtain the finally shaped articles, the blended material or the pellets thereof may be supplied to a molding machine (injection-, extrusion-, blow- or press-molding machine), thereby molding the material or the pellets into the shaped articles, however, as the case may be, the admixing of the additives with the polyester may be carried out in a molding machine.

Furthermore, well known additives for example, stabilizers such as hindered phenols or copper salts, flame retardant such as bromine-containing compounds, anti-static agents, ultraviolet absorbers, dyes and pigments may be added to the polyester together with the above-mentioned additives.

The present invention will be explained more in detail while referring to the non-limitative examples and comparative examples as follows.

In addition, the percentages and the parts concerning the amount of substance in the examples and comparative examples are "by weight."

Furthermore, IZOD impact strength, the tensile strength and the elongation at break, and the bending strength of the specimen were measured respectively by ASTM D256, ASTM D638 and ASTM D790.

I. EXAMPLES AND COMPARATIVE EXAMPLES OF PRODUCTION OF MODIFIED COPOLYMERS OF ETHYLENE AND $\alpha$-OLEFIN

Example 1

Production of a modified copolymer of ethylene and butene-1, which is modified by grafting tetrahydrofurfuryl methacrylate (A):

After blending 100 parts by weight of a copolymer of ethylene and butene-1 having a crystallinity of 20% and MI of 3.6 and containing 14 mol % of butene-1 units, 0.05 part by weight of $\alpha,\alpha'$-bis-t-butylperoxy-p-diisopropylbenzene (after being dissolved in a small amount of acetone) and one part by weight of tetrahydrofurfuryl methacrylate (made by MITSUBISHI Rayon Co., Ltd. under the name of ACRYL-ESTER THF), the thus blended material was extruded at 200° C. by using a biaxial extruder of an inner diameter of 30 mm (made by NAKATANI Machinery Co., Ltd.) and then was formed into pellets.

The crystallinity and MI of the thus produced, modified copolymer were 20% and 2.0, respectively.

After pulverizing a portion of the thus produced pellets and extracting the unreacted material from the pulverized material, the amount of grafted tetrahydrofurfuryl methacrylate was measured by an IR method. The amount was 0.2% by weight of the amount of the copolymer of ethylene and butene-1.

Comparative Example 1

Production of a modified copolymer of ethylene and butene-1, which is modified by grafting maleic acid(B):

A grafted copolymer of ethylene and butene-1 modified by maleic acid was obtained by the same method as in Example 1 except for using 0.5 part by weight of maleic anhydride instead of one part by weight of tetrahydrofurfuryl methacrylate in Example 1. The amount of grafted maleic anhydride was 0.4% by weight of the amount of the copolymer of ethylene and butene-1, and the crystallinity and MI of the product were 20% and 1.9, respectively.

Example 2

Production of a modified copolymer of ethylene and butene-1, which is modified by grafting maleic anhydride and tetrahydrofurfuryl methacrylate(C):

After blending 100 parts by weight of the modified copolymer produced in Comparative Example 1, 0.05 part by weight of $\alpha\alpha'$-bis-t-butylperoxy-p-diisopropylbenzene (after being dissolved in a small amount of acetone) and one part by weight of tetrahydrofurfuryl methacrylate in the same manner as in Example 1, the thus formed mixture was extruded and formed into pellets. The crystallinity and MI of the thus formed, modified copolymer to which two kinds of functional groups have grafted were 20% and 2.2, respectively, and the amounts of maleic anhydride and tetrahydrofurfuryl methacrylate therein were 0.35% by weight and 0.17% by weight of the amount of the modified copolymer.

Example 3

Production of a modified copolymer of ethylene and butene-1 which is grafted with an ester of an $\alpha,\beta$-unsaturated carboxylic acid(D):

In the same manner as in Example 1 except for using one part by weight of the ester of an α,β-unsaturated carboxylic acid represented by the following formula instead of one part by weight of tetrahydrofurfuryl methacrylate, pellets were produced.

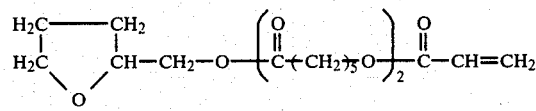

(made by NIPPON KAYAKU KABUSHIKI KAISHA, under the registered trade mark, KAYARAD TC 120S).

The crystallinity and MI of the thus produced, modified copolymer were 20% and 2.0, respectively.

After pulverizing a part of the thus produced pellets and extracting the unreacted matters by acetone, the grafted amount of the ester of α,β-unsaturated carboxylic acid was measured by the IR method. The result was 0.5% by weight of the amount of the modified copolymer.

Example 4

Production of a modified copolymer of ethylene and butene-1 which is grafted with both the ester of α,β-unsaturated carboxylic acid and maleic anhydride(E):

In the same manner as in Example 1 except for using 0.5 part by weight of maleic anhydride instead of one part by weight of tetrahydrofurfuryl methacrylate, a modified copolymer of ethylene and butene-1, which was grafted with maleic anhydride.

After blending 100 parts by weight of the thus produced, modified copolymer, 0.05 part by weight of α,α'-bis-t-butylperoxy-p-diisopropylbenzene (after being dissolved in a small amount of acetone) and one part by weight of the same ester as in Example 3 in the same manner as in Example 1, the blended mixture was formed into pellets as in Example 1. The thus produced, modified copolymer which was grafted with two kinds of functional groups showed the crystallinity of 20%, and MI of 2.4. The grafted amounts of maleic anhydride and the ester of α,β-unsaturated carboxylic acid were 0.34% by weight and 0.50% by weight, respectively of the amount of the modified copolymer.

Comparative Example 2

Production of a modified copolymer of ethylene and butene-1, which is grafted with methyl methacrylate(F):

After blending 100 parts by weight of a copolymer of ethylene and butene-1 having a crystallinity of 20% and MI of 3.6 and containing 14 mol % of butene-1 units, 0.05 part by weight of αα'-bis-t-butylperoxy-p-diisopropylbenzene (after being dissolved in a small amount of acetone) and one part by weight of methyl methacrylate, the thus blended mixture was extruded at 200° C. while using the same extruder as in Example 1 and then was formed into pellets. The thus produced, modified copolymer of ethylene and butene-1 which was grafted with methyl methacrylate showed the crystallinity and MI of 20% and 2.1, respectively. The grafted amount of methyl methacrylate, measured by the same technique as in Example 1 was 0.23% of the amount of the modified copolymer.

Comparative Example 3

Production of a modified copolymer of ethylene and butene-1 which is grafted with glycidyl methacrylate (G):

By the same procedures as in Comparative Example 2 except for using glycidyl methacrylate instead of methyl methacrylate in Comparative Example 2, the modified copolymer of ethylene and butene-1 which was grafted with glycidyl methacrylate was obtained. The amount of grafted glycidyl methacrylate was 0.18% by weight of the amount of the modified copolymer, and the crystallinity and MI of the modified copolymer were 20% and 1.7, respectively.

Comparative Example 4

Production of a modified copolymer of ethylene and butene-1 which is grafted with methyl methacrylate and maleic anhydride(H):

By the same procedures as in Comparative Example 2 except for using a modified copolymer of ethylene and butene-1 which was grafted with 0.4% by weight of maleic anhydride, instead of the copolymer of ethylene and butene-1 in Comparative Example 2, a modified copolymer of ethylene and butene-1 which was grafted with maleic anhydride and methyl methacrylate was produced. The thus obtained, modified copolymer which was grafted with two kinds of functional groups showed the crystallinity and MI of 20% and 2.0, respectively. The grafted amounts of maleic anhydride and methyl methacrylate were 0.34% by weight and 0.20% by weight, respectively of the amount of the modified copolymer.

Comparative Example 5

Production of a modified copolymer of ethylene and butene-1 which is grafted with glycidyl methacrylate and maleic anhydride (I):

By the same procedures as in Comparative Example 3 except for using a modified copolymer of ethylene and butene-1 to which was grafted with 0.4% by weight of maleic anhydride, instead of the copolymer of ethylene and butene-1 in Comparative Example 3, a modified copolymer of ethylene and butene-1 which was grafted with glycidyl methacrylate and maleic anhydride was produced. The thus produced, modified copolymer of ethylene and butene-1 which was grafted with two kinds of functional groups showed the crystallinity and MI of 20% and 1.5, respectively. The grafted amount of maleic anhydride and glycidyl methacrylate were 0.33% by weight and 0.15% by weight, respectively.

II. EXAMPLES AND COMPARATIVE EXAMPLES OF PRODUCTION OF POLYESTER COMPOSITIONS EXAMPLES 5 TO 8 AND COMPARATIVE EXAMPLES 6 TO 10

After blending 100 parts by weight of a polybutylene terephthalate of a limiting viscosity number, [η], of 1.1, and 20 parts by weight of each of the modified copolymer of ethylene and the α-olefin (butene-1), which had been produced in Examples 1 to 4 and Comparative Examples 1 to 5, the blended material was molded into shaped specimen for measuring the physical properties thereof at a resin temperature of 260° C. and a mold temperature of 80° C. while using an injection molding machine of a capacity of 3.6 ounces (made by TOSHIBA Machinery Co., Ltd., model IS 75PN II).

The physical properties of each of the thus shaped specimen are shown in Table 1.

TABLE 1

| Examples and Comparative Examples | Modified copolymer of ethylene and butene-1 | Impact Strength (IZOD) (kg · cm/cm) | Tensile Strength (kg/cm²) | Tensile Elongation (%) |
|---|---|---|---|---|
| Ex 5 | A (of Ex 1) | 40 | 360 | 74 |
| Ex 6 | C (of Ex 2) | 60 | 360 | 85 |
| Ex 7 | D (of Ex 3) | 50 | 360 | 110 |
| Ex 8 | E (of Ex 4) | 75 | 370 | 165 |
| Comp Ex 6 | B (of Comp Ex 1) | 20 | 350 | 48 |
| Comp Ex 7 | F (of Comp Ex 2) | 10 | 350 | 20 |
| Comp Ex 8 | G (of Comp Ex 3) | 18 | 350 | 40 |
| Comp Ex 9 | H (of Comp Ex 4) | 19 | 350 | 50 |
| Comp Ex 10 | I (of Comp Ex 5) | 21 | 350 | 45 |

Examples 9 to 11

After blending 100 parts by weight of a polybutylene terephthalate of a limiting viscosity number ([η]) of 1.1, 12 parts by weight of each of the modified copolymers of ethylene and butene-1 produced in Example 1(A), Example 2(C) and Example 4(E), respectively and 0.5 part by weight of bisphenol A diglycidylether (made by ADEKA Argus Co., Ltd. with a mark of EP 17) which is a bifunctional epoxy compound, the thus blended material was extruded at a resin temperature of 250° C. while using an extruder of 40 mm in inner diameter (made by ISUZU KAKO Co. Ltd.) and was formed into pellets. After preparing the test specimen from the thus prepared pellets, the test specimens were subjected to physical property test in the same manner as in Example 6. The results are shown in Table 2.

TABLE 2

| Examples | Modified copolymer of ethylene and butene-1 | Impact Strength (IZOD) (kg · cm/cm) | Tensile Strength (kg/cm²) | Tensile Elongation (%) |
|---|---|---|---|---|
| 9 | A (of Ex 1) | 50 | 430 | 180 |
| 10 | C (of Ex 2) | 72 | 430 | ≧200 |
| 11 | E (of Ex 4) | 80 | 430 | ≧200 |

Examples 12 to 14 and Comparative Examples 11 to 14

By the same procedures as in Examples 9 to 11 except for further adding 0.5 part by weight of bis(dipropylphenyl)carbodiimide to each of the polyester compositions produced in Examples 9 to 11, the test specimens of 1/32 inch in thickness were prepared and subjected to the hinge-resistance test according to the method of measuring MIT bending-resistance in Japanese Industrial Standards (JIS) P8115.

Separately, in Comparative Examples 11 to 14, four samples of the polyester compositions shown in Table 3 were produced and subjected to the same test as above. The results of the test are shown also in Table 3.

TABLE 3

| Examples or Comparative Examples | Modified copolymer of ethylene and butene—1 or acryl rubber[1] (part by weight) | Carbodiimide (part) | Epoxy compound | Hinge-resistance (time) | Impact strength (IZOD) (kg · cm/cm) |
|---|---|---|---|---|---|
| Ex 12 | A (of Ex 1) 12 | 0.5 | 0.5 | 13,000 | 52 |
| Ex 13 | C (of Ex 2) 12 | 0.5 | 0.5 | 14,000 | 75 |
| Ex 14 | E (of Ex 4) 12 | 0.5 | 0.5 | 14,500 | 85 |
| Comp Ex 11 | Acryl rubber 12 | — | — | 3,900 | 8 |
| Comp Ex 12 | Acryl rubber 12 | 0.5 | 0.5 | 4,000 | 9 |
| Comp Ex 13 | — | — | — | 2,900 | 5 |
| Comp Ex 14 | — | 0.5 | 0.5 | 3,000 | 5 |

Note:
[1]Acryl rubber is the product of Rohm and Haas Co. with the mark of KM330.

Examples 15 to 18 and Comparative Examples 15 to 17

After blending 100 parts by weight of polybutylene terephthalate of a limiting viscosity number ([η]) of 0.85, 10 parts by weight of each of the modified copolymer of ethylene and butene-1 shown in Table 4, 40 parts by weight of each of the inorganic fillers shown also in Table 4 with or without adding 0.5 part by weight of an epoxy compound and extruding the thus blended composition by using a bent-extruder of 40 mm in inner diameter, test specimens were prepared from the thus produced composition as in Examples 5 to 8.

Of the inorganic fillers, glass fiber was made by ASAHI Fiberglass Co., Ltd. with the mark of CSO3 MA 486; mica was supplied by HAYASHI KASEI Co., Ltd. with the mark of Y1000M, and the epoxy compound was made by ADEKA Argus Co., Ltd. with the mark of EP 17. The test results of the test specimens are also shown in Table 4.

TABLE 4

| Examples or Comparative Examples | Modified copolymer | Inorganic filler | Epoxy compound (part by weight) | Physical properties | | | | |
|---|---|---|---|---|---|---|---|---|
| | | | | Impact strength (IZOD) (kg.cm/cm) | Tensile strength (kg/cm²) | Elongation at break (%) | Bending strength (kg/cm²) | Elasticity in bending (kg/cm²) |
| Ex 15 | C (of Ex 2) | Glass fibers | 0.5 | 18 | 1,300 | 7.0 | 1,700 | 61,000 |
| Ex 16 | A (of Ex 1) | Glass fibers | 0.5 | 15 | 1,150 | 6.5 | 1,600 | 62,000 |
| Comp Ex 15 | B (of Comp Ex 1) | Glass fibers | 0.5 | 13 | 1,050 | 6.0 | 1,550 | 61,000 |

TABLE 4-continued

| Examples or Comparative Examples | Modified copolymer | Inorganic filler | Epoxy compound (part by weight) | Impact strength (IZOD) (kg.cm/cm) | Tensile strength (kg/cm²) | Elongation at break (%) | Bending strength (kg/cm²) | Elasticity in bending (kg/cm²) |
|---|---|---|---|---|---|---|---|---|
| Ex 17 | C (of Ex 2) | Mica | 0.5 | 15 | 1,200 | 8.0 | 1,700 | 61,000 |
| Comp Ex 16 | B (of Comp Ex 1) | Mica | 0.5 | 13 | 1,050 | 6.0 | 1,550 | 61,000 |
| Ex 18 | C (of Ex 2) | Glass fibers | — | 15 | 1,200 | 6.5 | 1,600 | 61,000 |
| Comp Ex 17 | B (of comp Ex 1) | Glass fibers | — | 12 | 1,000 | 6.0 | 1,550 | 60,000 |

Examples 19 and 20

A mixture prepared by admixing 100 parts by weight of a resin composition comprising 75% by weight of a polybutylene terephthalate of a limiting viscosity number ([η]) of 1.1 and 25% by weight of one of the modified copolymers of ethylene and an α-olefin, which had been produced in Examples 1 to 4 with 25 parts by weight of a carbon black of a specific surface area of 1120 m²/g and an oil-absorption of 375 ml/100 g (made by Lion-Akzo Co., Ltd. under the registered trade name of KECHENBLACK EC) was melt-extruded while using a biaxial extruder of 30 mm in inner diameter (NAKATANI Machinery Co., Ltd.) at the resin temperature of 260° C. to obtain the polyester composition, and was formed into pellets.

After preparing test specimen from the thus produced pellets of the polyester composition, at the resin temperature of 270° C. and the metal-mold temperature of 80° C. in the same manner as in Example 5, physical properties of the test specimen were measured. The results are shown in Table 5.

Example 21

A mixture prepared by admixing 100 parts by weight of a resin composition comprising 74.5% by weight of the same polybutylene terephthalate as in Examples 19 and 20, 25% by weight of the same modified copolymer of ethylene and an α-olefin as in Examples 19 and 20 and 0.5% by weight of bisphenol A diglycidyl ether (a bifunctional epoxy compound, made by ADEKA-Argus Co., Ltd. under the mark of EP17) with 25 parts by weight of the same carbon black as in Examples 19 and 20 was melt-extruded as in Examples 19 and 20, and the extruded mixture, i.e. the polyester composition according to the present invention was formed into pellets.

After preparing test specimen from the thus prepared pellets of the polyester composition in the same manner as in Example 5, physical properties of the test specimen were measured, the results also being shown in Table 5.

Comparative Example 18

A mixture of 100 parts by weight of the same polybutylene terephthalate as in Examples 19 and 20 and 25 parts by weight of the same carbon black as in Examples 19 and 20 was melt-extruded in the same manner as in Examples 19 and 20. The thus produced polyester composition was formed into pellets, and test specimen were prepared from the composition in the same manner as in Examples 19 and 20. The physical properties of the composition measured on the test specimen are also shown in Table 5.

TABLE 5

| Examples or Comparative Example | Modified copolymer[1] | Inorganic filler | Impact strength (IZOD) (kg·cm/cm) | Specific volume resistance (Ω·cm³) |
|---|---|---|---|---|
| Ex 19 | A (of Ex 1) | Carbon black | 3.5 | 3 × 10⁶ |
| Ex 20 | C (of Ex 2) | Carbon black | 4.5 | 2 × 10⁶ |
| Ex 21 | C (of Ex 2) | Carbon black | 5.0 | 5 × 10⁵ |
| Comp Ex 18 | — | Carbon black | 1.3 | 3 × 10⁷ |

Note:
[1]Modified copolymer of ethylene and butene—1 (refer to Table 1, for A and C)

What is claimed is:

1. A polyester compositon, comprising:
   (A) a polyalkylene terephthalate or a copolymer composed of polyalkylene terephthalate and
   (B) a modified copolymer of ethylene and α-olefin prepared by grafting (1) from 0.01 to 2.0 wt % of an ester of an α,β-unsaturated carboxylic acid of the formula (I):

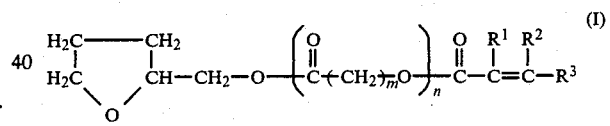

wherein n is zero or an integer up to 4; m is an integer of from 1 to 10; R¹ and R² respectively represent a hydrogen atom, or an alkyl group and R³ represents a hydrogen atom and alkyl group or a carboxyl group, based on the amount of α-olefin-ethylene copolymer, or (2) from 0.01 to 2.0 weight percent of said ester of an α,β-unsaturated carboxylic acid represented by the formula(I), based on the amount of the α-olefin-ethylene copolymer, and an α,β-unsaturated carboxylic acid or an anhydride thereof with a copolymer of ethylene and an α-olefin prepared by copolymerizing not less than 50 mol % ethylene and not more than 50 mol % of an α-olefin having not less than three carbon atoms.

2. The polyester composition of claim 1, comprising said polyalkylene terephthalate, said modified copolymer of ethylene and an α-olefin and an inorganic filler.

3. The polyester composition of claim 2, wherein the amount of said inorganic filler is from 0.5 to 120 parts by weight to 100 parts by weight of said polyalkylene terephthalate or said copolymer composed of polyalkylene terephthalate.

4. The polyester composition of claim 1, wherein said α-olefin is a member selected from the group consisting of propylene, butene-1, hexene-1, decene-1, 4-methylbutene-1 and 4-methylpentene-1.

5. The polyester composition of claim 1, wherein the amount of said modified copolymer of ethylene and an α-olefin is from 0.5 to 120 parts by weight per 100 parts by weight of said polyalkylene terephthalate or said copolymer composed of polyalkylene terephthalate.

6. The polyester composition of claim 1, wherein the amount of said α,β-unsaturated carboxylic acid or the anhydride thereof grafted onto the unmodified copolymer of ethylene and an α-olefin ranges from 0.05 to 5% by weight based on the amount of the unmodified copolymer of ethylene and an α-olefin.

* * * * *